(12) United States Patent
ParandehGheibi et al.

(10) Patent No.: US 10,110,646 B2
(45) Date of Patent: *Oct. 23, 2018

(54) NON-INTRUSIVE PROXY SYSTEM AND METHOD FOR APPLICATIONS WITHOUT PROXY SUPPORT

(71) Applicant: Network Coding, Inc., Los Angeles, CA (US)

(72) Inventors: Ali ParandehGheibi, Medford, MA (US); Richard Barry, Los Angeles, CA (US)

(73) Assignee: Network Coding, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/952,704

(22) Filed: Nov. 25, 2015

(65) Prior Publication Data

US 2016/0080443 A1 Mar. 17, 2016

Related U.S. Application Data

(63) Continuation of application No. 13/418,269, filed on Mar. 12, 2012, now Pat. No. 9,215,127.

(51) Int. Cl.
*H04L 29/06* (2006.01)
*H04L 29/08* (2006.01)

(52) U.S. Cl.
CPC .... *H04L 65/4069* (2013.01); *H04L 29/08081* (2013.01); *H04L 67/02* (2013.01); *H04L 67/2814* (2013.01); *H04L 67/42* (2013.01)

(58) Field of Classification Search
CPC ........... H04L 63/0281; H04L 29/08081; H04L 65/4069; H04L 67/42; H04L 67/2814; H04L 67/02
USPC ......................... 709/203, 217, 219, 223, 246
See application file for complete search history.

(56) References Cited

U.S. PATENT DOCUMENTS

| 6,389,462 | B1 | 5/2002 | Cohen et al. |
| 6,421,733 | B1 | 7/2002 | Tso et al. |
| 6,801,927 | B1 | 10/2004 | Smith et al. |
| 7,096,249 | B2 * | 8/2006 | Rajic ......................... G06F 9/54 709/201 |
| 8,291,081 | B2 * | 10/2012 | Ahmed ............. G06F 17/30902 709/217 |
| 8,510,460 | B2 * | 8/2013 | Hsu ....................... H04L 65/604 709/231 |

(Continued)

*Primary Examiner* — Oanh Duong
(74) *Attorney, Agent, or Firm* — Seed Intelletual Property Law Group LLP

(57) ABSTRACT

A system and method is disclosed for enabling a redirection application to use non-proxy-enabled modules for communication with a server through a proxy server, in which a non-proxy-enabled module takes an address or an URL as the input to establish a connection with the server. This system and method does not require administrative access (e.g. super-user, root, and the like), which is useful for mobile devices where obtaining such privileges is typically difficult. In one embodiment, a media application may use a media player provided by an operating system as a module. In this embodiment, the media application is the redirection application and the media player is the module. The non-proxy-enabled modules use addresses or URLs to locate and fetch data.

23 Claims, 4 Drawing Sheets

(56) References Cited

U.S. PATENT DOCUMENTS

| | | | | |
|---|---|---|---|---|
| 8,554,938 | B2* | 10/2013 | Mittal | G06F 17/30899 709/230 |
| 9,215,127 | B2* | 12/2015 | ParandehGheibi | H04L 29/08081 709/203 |
| 2006/0059092 | A1* | 3/2006 | Burshan | H04L 29/06 705/51 |
| 2008/0005348 | A1* | 1/2008 | Kosiba | H04L 29/06027 709/231 |
| 2009/0077205 | A1* | 3/2009 | Quinet | H04L 29/06 709/219 |
| 2009/0113532 | A1* | 4/2009 | Lapidous | G06F 17/30876 726/7 |
| 2009/0259956 | A1* | 10/2009 | Barsook | H04N 5/44513 715/764 |
| 2009/0288104 | A1* | 11/2009 | Bagepalli | H04L 63/10 719/328 |
| 2011/0231555 | A1* | 9/2011 | Ebrahimi | H04L 63/102 709/226 |
| 2012/0002717 | A1* | 1/2012 | Ma | H04N 21/44209 375/240.01 |
| 2012/0011267 | A1* | 1/2012 | Ma | H04N 21/44209 709/231 |
| 2012/0023593 | A1* | 1/2012 | Puder | H04L 63/101 726/28 |
| 2012/0170741 | A1* | 7/2012 | Chen | H04L 63/0428 380/210 |
| 2012/0278497 | A1* | 11/2012 | Hsu | H04L 65/604 709/231 |
| 2013/0007863 | A1* | 1/2013 | Burckart | H04N 21/222 726/7 |
| 2013/0166906 | A1* | 6/2013 | Swaminathan | H04L 65/4084 713/155 |

* cited by examiner

```
#EXTM3U
#EXT-X-TARGETDURATION:20
#EXT-X-MEDIA-SEQUENCE:342

#EXTINF:20,
http://example.com/segment1.ts
#EXTINF:20,
http://example.com/segment2.ts
#EXTINF:20,
http://example.com/segment3.ts
#EXTINF:20,
http://example.com/segment4.ts
```

```
#EXTM3U
#EXT-X-TARGETDURATION:20
#EXT-X-MEDIA-SEQUENCE:342

#EXTINF:20,
http://localhost:pppp/example.com/segment1.ts
#EXTINF:20,
http://localhost:pppp/example.com/segment2.ts
#EXTINF:20,
http://localhost:pppp/example.com/segment3.
```

NON-INTRUSIVE PROXY SYSTEM AND METHOD FOR APPLICATIONS WITHOUT PROXY SUPPORT

CROSS-REFERENCE TO RELATED APPLICATIONS

This application is a continuation of U.S. application Ser. No. 13/418,269, filed Mar. 12, 2012, which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

There are many reasons for an application to use a proxy to communicate with another application or server. Some of these reasons include anonymity of the client, accelerating access to resources (using caching or custom protocols), applying access policy to network content and services, monitoring incoming and outgoing traffic, translating non-standard protocols, and so forth.

To access the content through a proxy, there are currently three methods typically available. The first method is to change the system's global proxy setting. In this scenario, a system (such as the operation system) provides a method to enable a system-wide proxy setting in which all connections to/from the system are directed via the proxy. Often, this method requires the user to configure the proxy settings properly. For example, there are WiFi proxy settings for iOS/Android devices, but not 3G proxy settings. Another example is the use of VPN clients to tunnel all the traffic to a VPN server. This approach may not be desirable if the goal is to use a particular application through a proxy server.

The second method is to use proxy-enabled applications and modules. A few applications support SOCKS proxy or HTTP proxy settings which can be enabled by the user. Similarly, some software modules provide API's to change and control their proxy settings. Such applications and modules may be referred to as "proxy-enabled." For example, many web browsers such as Firefox, Internet Explorer, and Chrome are proxy-enabled. A drawback of this approach is that it is limited to applications and modules that already support the desirable protocols and provide an interface to control them.

The third method is to intercept system calls. In this regard, there are ways to intercept system calls, such as TCP socket calls or HTTP commands. By intercepting these system calls, it is possible to manipulate them and force the traffic to be redirected to a proxy. This approach requires administrative access, and its functionality is extremely system dependent with unpredictable behavior. Accordingly, there is a continuing need for systems and methods to access content through a proxy without the above-described disadvantages.

SUMMARY

Briefly, and in general terms, various embodiments are directed to a method of redirecting traffic through a proxy from a non-proxy-enabled module using a redirection application. The method includes: translating an original address (ADD) of a destination server to a new address (ADD') using a processor, the new address (ADD') pointing to the proxy and containing all the information about the original address (ADD); providing the new address (ADD') to the non-proxy-enabled module, the non-proxy-enabled module subsequently making a protocol request, including a data request, connection request, status request, or combination thereof, to the proxy over a network or a communication bus (either real or virtual); after receiving the protocol request at the proxy, extracting the original address (ADD) from the new address (ADD') using a processor; forwarding the protocol request to the desired destination indicated by the original address (ADD) over a network or a communication bus (either real or virtual), using the proxy; receiving data at the proxy from the destination server over a network or a communication bus (either real or virtual); and forwarding the data from the destination server to the non-proxy-enabled module.

Another embodiment is directed towards a system for communicating with a server through a proxy using a redirection application residing on a device and a non-proxy-enabled module residing on the device, which takes addresses or URLs as the input to establish connections. This system comprises a device including a processor, a hyper-proxy that initiates a connection to a server over a network or a communication bus (either real or virtual), and a redirection application that transmits an original address (ADD) to a hyper-proxy via a communication bus or a network (either real or virtual). The hyper-proxy returns a new address (ADD') via a communication bus or a network to the redirection application (either real or virtual). The new address (ADD') contains all the information about the original address (ADD) but points to the hyper-proxy. The redirection application transmits the new address (ADD') to the non-proxy-enabled module using a communication bus or a network (either real or virtual), the non-proxy-enabled module establishing a connection to the hyper-proxy using a communication bus or a network (either real or virtual). The hyper-proxy extracts the original address (ADD) from the new address (ADD') using a processor, and forwards a request to a desired destination indicated by the original address (ADD) over a network or a communication bus, using the proxy. The data is received at the proxy from a destination server over a network or a communication bus (either real or virtual), wherein the data is forwarded from the destination server to the non-proxy-enabled module.

In still another embodiment, a system is disclosed for communicating with a server through a proxy using a redirection application to enable non-proxy-enabled media player modules to use a streaming protocol with a playlist. The system comprises a device including a processor, a hyper-proxy that initiates a connection to a server over a network or a communication bus (either real or virtual), and a redirection application that transmits an original address (ADD) of a playlist to the hyper-proxy, wherein the hyper-proxy returns a new address (ADD') to the redirection application over a communication bus or a network (either real or virtual), and wherein the new address (ADD') points to the hyper-proxy and contains all the information about the original address (ADD). The redirection application transmits the new address (ADD') to the non-proxy-enabled media player module, and wherein the non-proxy-enabled media player module establishes a connection to the hyper-proxy over a communication bus or a network (either real or virtual). The hyper-proxy receives the playlist from the server, modifies the addresses in the playlist, which enables the modified addresses to point to the hyper-proxy and contain all the information about the original address, the hyper-proxy providing the modified playlist to the media player.

Other features and advantages will become apparent from the following detailed description, taken in conjunction with the accompanying drawings, which illustrate by way of example, the features of the various embodiments.

DETAILED DESCRIPTION

Figures 1, 2:
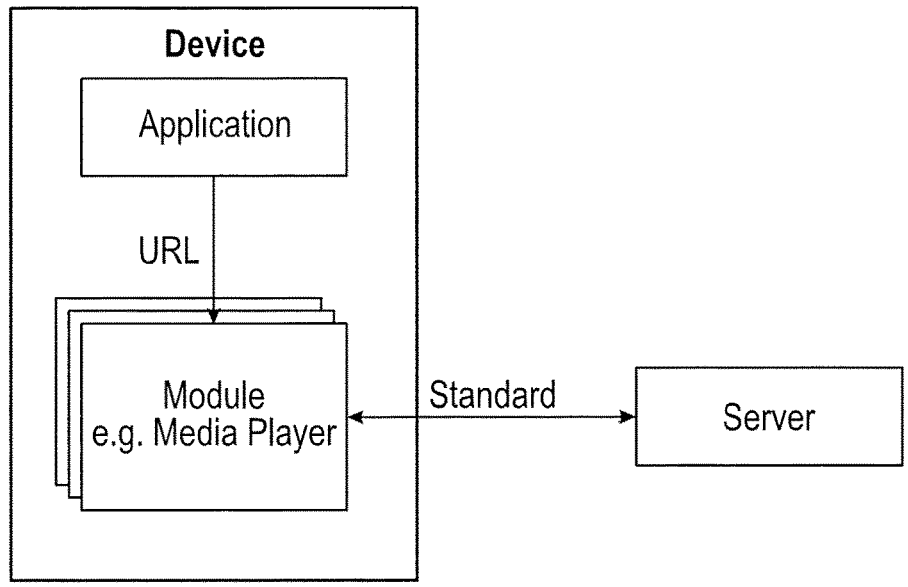
FIG. 1 illustrates a module, e.g., media player, which requests content from the server using a URL.
FIG. 2 illustrates a sample playlist file.

Referring now to the drawings, wherein like reference numerals denote like or corresponding parts throughout the drawings and, more particularly to FIGS. 1-7, there are shown various embodiments of a system for data management and collection. In one embodiment, applications and modules are not proxy-enabled; however, it is desirable to use a proxy. In some preferred embodiments of the non-intrusive proxy system, it is advantageous to utilize a proxy without changing the system-wide proxy setting or administrative privileges. Referring now to FIG. 1, a module (e.g., media player) is shown that requests content from the server using a URL. The applications and modules need not be standalone programs, but instead are libraries (with no proxy support) that may be used by developers to build other applications that are proxy-enabled.

In one example, a module connects to a server and downloads a file from the server using a standard protocol such as FTP/TCP and HTTP/TCP. FIG. 1 illustrates a scenario where an application is built using a module. The input of this module is typically an address of the resource on the server in the form of a URI or URL, which allows the module to establish a connection with the server and request the proper content/data. An example of a resource URL is as follows.

URL=http://example.com/resource.mp4

In FIG. 1, the system does not provide a mechanism for the module to connect to a proxy and request content or data from the server via a proxy.

Another example of such modules is a media player in Android and/or iOS using an HTTP Live Streaming (HLS) protocol. In this example, the media player takes a URL as an input, and requests a playlist from the server (which is indicated by the URL), for instance:

URL=http://example.com/playlist.m3u8

In this embodiment, the playlist file contains a list of other addresses (URL's) to the different segments of the content. The media player uses the URLs in the playlist to request and fetch different segments of the media for playback. An example of a playlist file is provided below. In FIG. 2, a Sample playlist file is displayed. Notably, the playlist file may include pointers for other playlist files corresponding to different resolutions, advertisements, and the like.

Figures 3, 4A:
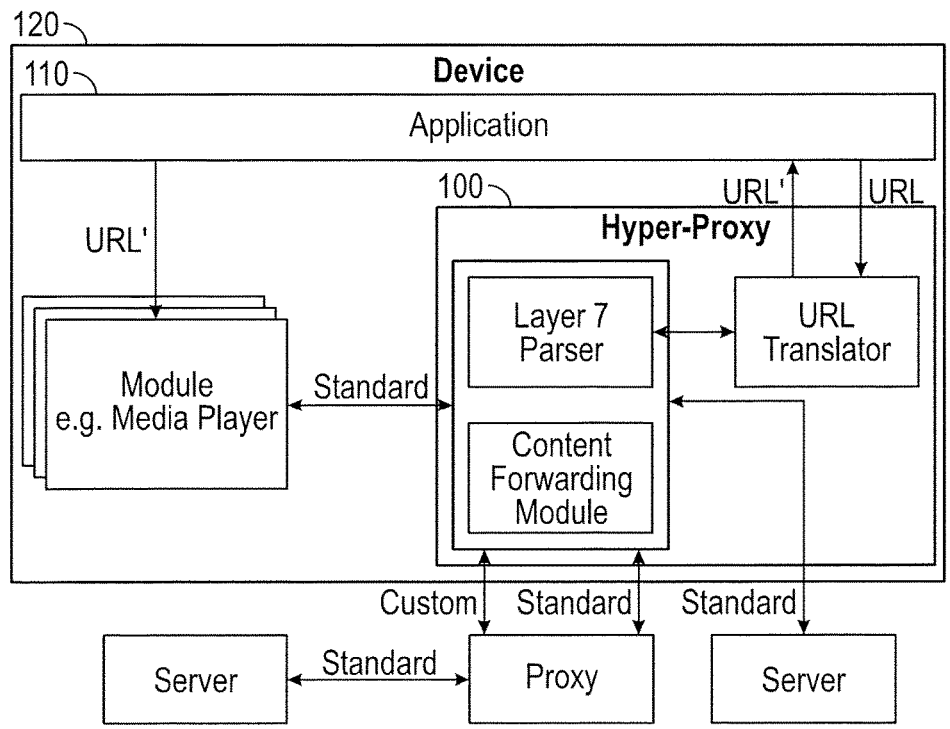
FIG. 3 illustrates a playlist file modified by a Layer 7 Parser.
FIG. 4A illustrates a hyper-proxy that enables applications to use proxies while using modules that are not proxy-enabled.
Figure 4B:
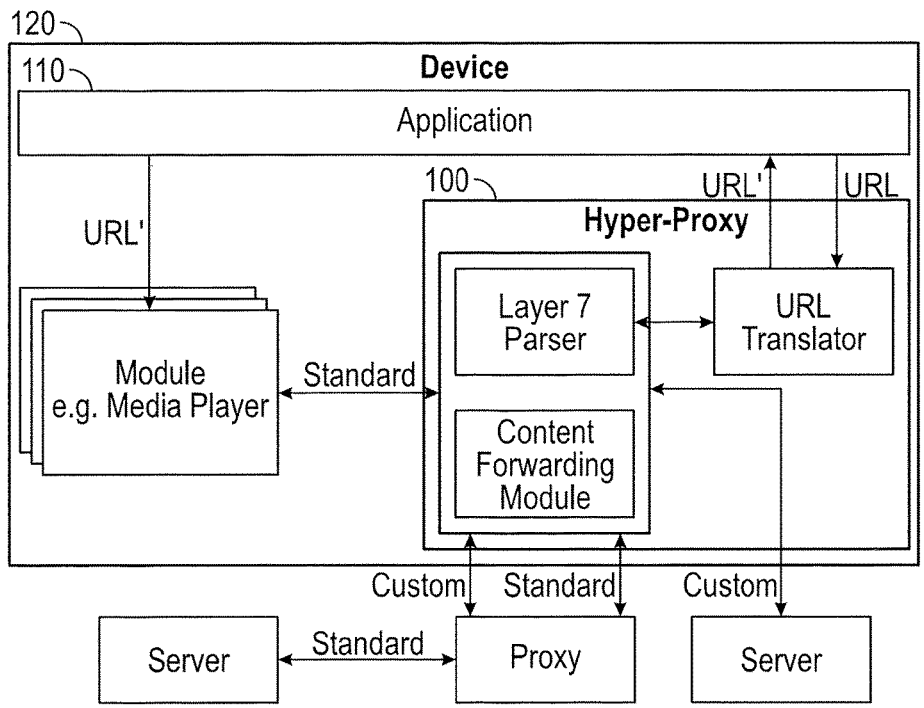
FIG. 4B illustrates a hyper-proxy that enables applications to use proxies while using modules that are not proxy-enabled, wherein there is a custom protocol connection between the Hyper-Proxy and the server.

In some embodiments, a system is provided for enabling an application to use non-proxy-enabled modules for communication with a server through a proxy, where the module takes a URL as the input. In one preferred embodiment, the system is configured as a "hyper-proxy 100," which performs more than the forwarding tasks of a typical proxy. Referring now to FIG. 4A, the architecture of a system using the hyper-proxy 100 module is illustrated. Although this embodiment of the hyper-proxy 100 is configured for modules which take URLs as input, other embodiments of the hyper-proxy 100 employ modules that use other addressing schemes to enable a redirection application 110 to use non-proxy-enabled modules for communication with a server through a proxy server.

In one embodiment of the non-intrusive proxy system, a hyper-proxy 100 is utilized with a module that requests data from a server indicated by a URL. Accordingly to this embodiment, the hyper-proxy module provides an interface for the application 110 to exchange the original URL with a new address, URL'. This URL' (i.e., the new URL) contains all the information about the URL (i.e., the original URL), but points to the hyper-proxy 100. For example, if the hyper-proxy 100 resides on the same device 120 as the application 110 and the URL is given by:

URL=http://example.com/resource.mp4.

Then, URL' could have the following structure:

URL'=http://localhost:pppp/example.com/resource.mp4 where localhost is the address of the hyper-proxy 100 which is listening to port pppp.

In some embodiments of the non-intrusive proxy system, a URL translator is the module which performs the task of generating URL' from URL. Notably, the hyper-proxy 100 may have a different address than the localhost. In that example, the proper address is used by the URL translator. Additionally, the operating system may take care of resolving the name localhost to the proper IP address (127.0.0.1) and route the requests to the hyper-proxy 100. Furthermore, in some embodiments, using a non-standard port number, e.g., port 8000, may be necessary for this system to work without administrative privileges, since listening to privileged ports such as port 80 may require administrative access.

Continuing, if an application 110 wishes to use a module via the hyper-proxy 100, the application provides the URL' to the module. When the module requests content at URL', it establishes a connection with the hyper-proxy 100. Once the connection between the module and the hyper-proxy 100 is established, the hyper-proxy recovers the original URL using the Layer 7 Parser. Using the recovered URL, the hyper-proxy 100 then establishes a connection with the server to receive data. Then, the hyper-proxy 100 forwards the content received from the server to the module.

In some embodiments of the non-intrusive proxy system, the functionality of the Layer 7 Parser is not limited to recovering URL from URL'. The Layer 7 Parser's main role is to parse and modify various application layer (or Layer 7)

protocol commands/messages to ensure that further requests from the module will be redirected to the hyper-proxy 100. This enables the non-intrusive proxy system to be a proxy solution for the module. The Layer 7 Parser may be configured to support various application layer protocols, such as HLS, JavaScript, HTML, and the like.

Example: Layer 7 Parser for HLS

In one example embodiment of the non-intrusive proxy system, the Layer 7 Parser is configured for HLS. Therefore, in this example, the module is a media player using HLS. As discussed above, the original URL points to a playlist file that is translated to an URL' of the following form:

URL'=http://localhost:pppp/example.com/playlist.m3u8.

Using the URL', the media player requests the playlist file from the hyper-proxy 100, which in turn gets the playlist from the server. Once the hyper-proxy 100 receives the playlist, the hyper-proxy performs a few operations before forwarding the playlist file to the media player module. The hyper-proxy 100 uses the Layer 7 Parser to change the URLs in the playlists, as discussed above. For the example of the playlist illustrated in FIG. 2, the modified playlist file may be of the form shown in FIG. 3, which displays a Playlist file modified by a Layer 7 Parser. The modified playlist is then forwarded to the media player. This ensures that further requests from the media player are directed to the hyper-proxy 100. This enables the non-intrusive proxy system to be a proxy for the media player.

Example: Layer 7 Parser for HTTP

In another example embodiment of the non-intrusive proxy system, the Layer 7 Parser is configured for HTTP connection. In this example, the module may be a browser using HTTP. When the module wishes to receive content, it sends a request to the server (using HTTP GET).

GET /path/file.html HTTP/1.1
Host: www.example.com:80

When employing the non-intrusive proxy system, the request is then modified. There are many ways to modify the HTTP GET request. One such example is presented below.

GET www.example.com:80/path/file.html HTTP/1.1
Host: localhost:pppp

When the module makes a request using the above HTTP GET message, the request is directed to the hyper-proxy 100 at localhost. The hyper-proxy 100 now needs to recover the original host name to make a proper connection to the server. The Layer 7 Parser for HTTP parses through the HTTP GET message and extracts the original request.

There are several variants to the non-intrusive proxy system, several of which are described below. In one embodiment of the non-intrusive proxy system, the hyper-proxy 100 is hosted on the same device 120 or machine as the application 110 and/or the module. However, in another embodiment, the hyper-proxy 100 may be hosted in another machine or a virtual machine. The non-intrusive proxy system may be configured in many different architectural formats, as long as the application 110 is able to exchange URLs with the hyper-proxy 100.

In another aspect, the non-intrusive proxy system may be chained, in the sense that, the hyper-proxy 100 may contact another upstream-proxy or hyper-proxy instead of contacting a server directly, as shown in the FIG. 4A. This configuration enables the two proxies to use any custom protocol as well as standard protocols (such as HTTP/TCP) between them. In this example, the address of the upstream-proxy or hyper-proxy 100 may be known or discovered by the first hyper-proxy 100. Alternatively, the address of the upstream-proxy or hyper-proxy 100 may be known or discovered by the application 110, in which case the address is either passed via an API to the hyper-proxy 100 or included in the original address URL, which is then extracted by the hyper-proxy. In this embodiment, the upstream-proxy may execute the Layer 7 Parser and modify the Layer 7 protocol messages/commands before forwarding to the hyper-proxy 100 or the server. When using this approach, the hyper-proxy 100 does not need to execute the Layer 7 Parser. This approach may lighten the load on the hyper-proxy 100.

In still another embodiment, the non-intrusive proxy system may be further chained to more than two hyper-proxies or proxies, using a combination or known addresses, URL translations, and address parsers.

In another aspect, the module may be a custom or a native media player. Continuing, the module may use an address or URL to locate and fetch data; however, there is no restriction to the transport protocol used. Therefore, the protocols supported in this system are not limited to HTTP/TCP. A module may be a library integrated into the application 110 or a standalone program that responds to requests by the application.

Figure 5:
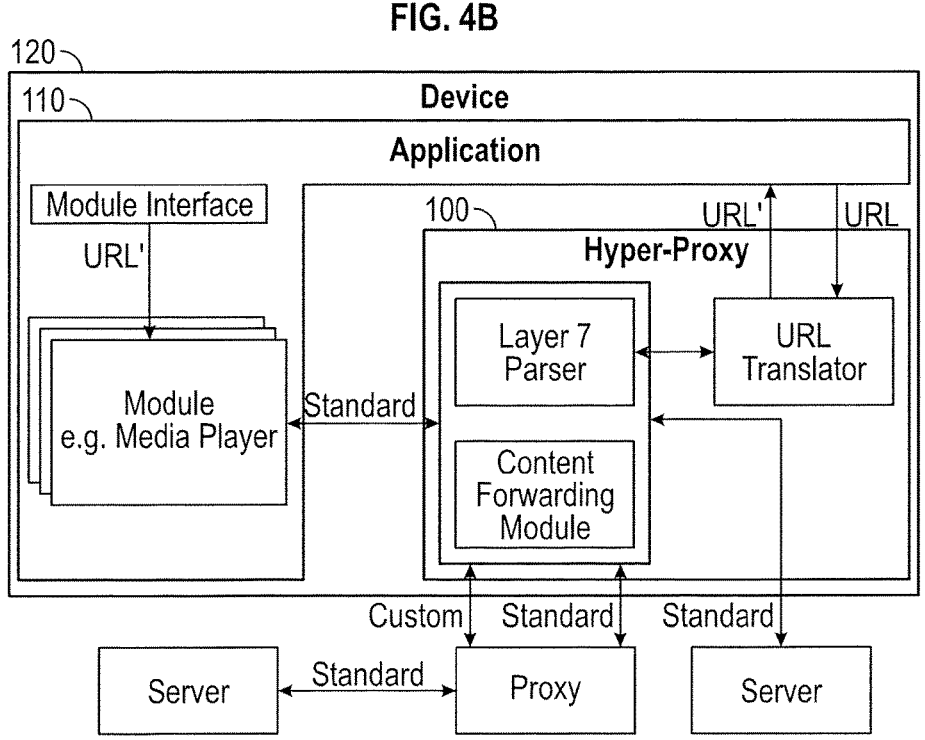
FIG. 5 illustrates the hyper-proxy as a separate software module/application/service with a content receiver integrated into the application.
Figure 6:
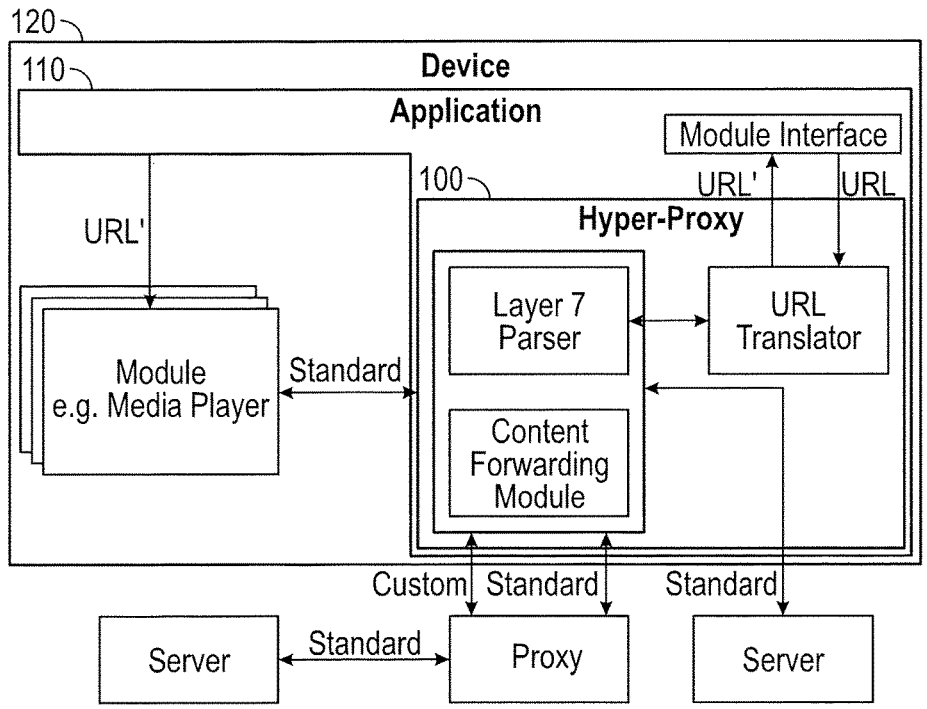
FIG. 6 illustrates a content receiver as a separate software module/application/service with a hyper-proxy integrated into the application.
Figure 7:
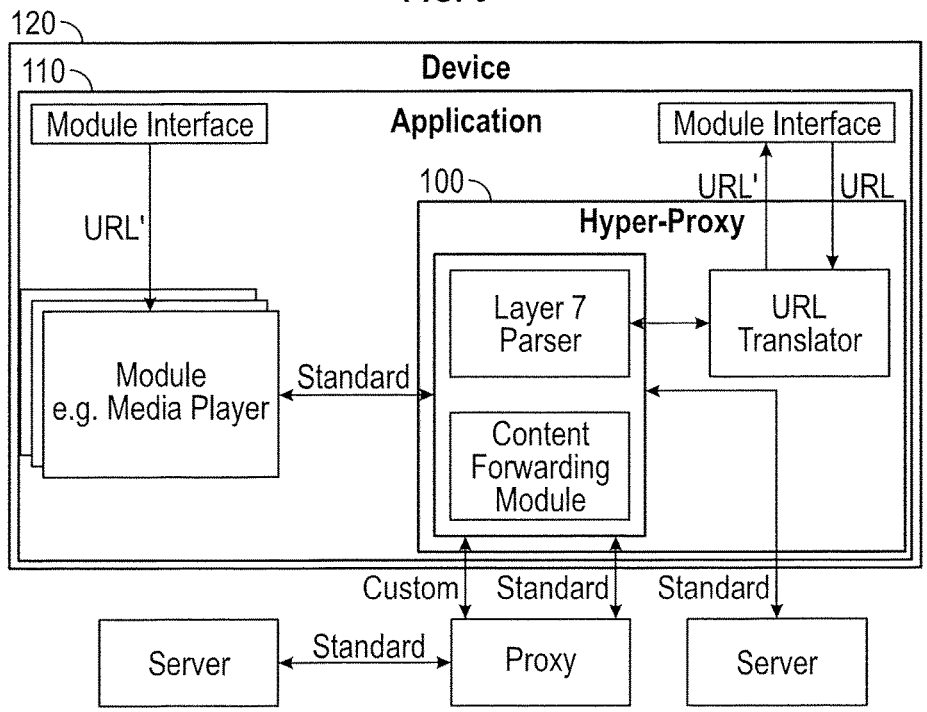
FIG. 7 illustrates both a hyper-proxy and a content receiver integrated into the application.

In yet another embodiment of the non-intrusive proxy system, the hyper-proxy 100 may be a library integrated into the application 110 or a standalone program that responds to requests by the application. FIGS. 4A-7 illustrate different architectures involving modules and a hyper-proxy 100. Specifically, FIG. 4A illustrates a hyper-proxy 100 that enables applications to use proxies while using modules that are not proxy-enabled, while FIG. 5 illustrates the hyper-proxy 100 as a separate software module/application/service with the module integrated into the application 110. Continuing, FIG. 6 illustrates the module as a separate software module/application/service with a hyper-proxy 100 integrated into the application 110. Finally, FIG. 7 illustrates both a hyper-proxy 100 and a module integrated into the application 110.

In one embodiment, a non-intrusive proxy method enables the use of a module that does not support the protocols supported by the server. In this embodiment, the protocol used between the module and the hyper-proxy 100 is different from that used between the hyper-proxy and the server.

The Layer 7 Parser has been described above in the context of HLS streaming, in which it reads and modifies a HLS playlist file. However, the Layer 7 Parser is not limited to simply HLS playlist parsing. In other embodiments, the Layer 7 Parser may also parse other types of files such as HTML/JavaScript files.

Continuing, the non-intrusive proxy system depicted in FIG. 4A is not limited to an application on mobile devices such as iOS and Android devices. Embodiments of the non-intrusive proxy system and method span all platforms and operating systems (e.g., Windows, Linux, OS X, and the like).

Furthermore, even though the non-intrusive proxy system has been discussed in terms of receiving data from a server, the proposed method also works for sending data or any other two-way communication mechanism.

In other embodiments of the non-intrusive proxy system, online or near-real-time delivery of the data to the module is achieved by proper pipelining and forwarding of the incoming data through the hyper-proxy 100. Furthermore, the data may be pre-fetched and/or cached at the hyper-proxy 100 or upstream proxy for faster response to the module's queries.

For example, when the original URL points to a playlist such as an HLS playlist, the hyper-proxy 100 is aware of the playlist, and thus, may pre-fetch content not yet requested by the application 110 in anticipation that such content will likely be needed.

Although, in the above embodiments, we have described the hyper-proxy 100 making requests to a server or upstream proxy at the time of the application 110 request, in other embodiments the connection between the hyper-proxy and the upstream proxy or server may be pre-established to any such requests, or maintained in a persistent state, to increase response time.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method of redirecting traffic through a proxy from a non-proxy-enabled module using a redirection application, the method comprising:
    translating an original address (ADD) of a destination server to a new address (ADD') using a processor, the new address (ADD') pointing to the proxy and containing all information about the original address (ADD);
    providing the new address (ADD') to the non-proxy-enabled module, the non-proxy-enabled module subsequently making a protocol request, including a data request, connection request, status request, or combination thereof, to the proxy using a standard transport protocol;
    after receiving the protocol request at the proxy, extracting the original address (ADD) from the new address (ADD') using a processor;
    forwarding the protocol request to the destination server indicated by the original address (ADD), using the proxy, wherein the proxy uses a custom protocol that supports persistent connections to communicate with the destination server, and wherein the persistent connections are connections maintained in a persistent state, thereby enabling a connection between the proxy and the destination server to be kept open when there is not a current session, wherein the custom protocol used to communicate between the proxy and destination server is different than the standard transport protocol used to communicate between the proxy and the non-proxy-enabled module;
    receiving data at the proxy from the destination server using the custom protocol; and
    forwarding the data from the destination server to the non-proxy-enabled module.

2. The method of claim 1, further comprising:
    forwarding the data from the destination server to the non-proxy-enabled module, except for layer 7 protocol messages or commands, wherein the messages or commands may contain addresses (ADD2) pointing towards a resource including a file, a server, or an index/list of files, which the proxy parses and modifies using a processor, wherein the addresses in the modified messages or commands point towards the proxy but contain all the information of the address (ADD2); and
    receiving the protocol request at the proxy from the non-proxy-enabled module, and forwarding the protocol request to the destination server, except for layer 7 protocol messages or commands, which proxy parses and modifies using a processor, enabling the addresses in the messages or commands to point towards a corresponding destination server.

3. The method of claim 2, wherein the messages or commands are a playlist.

4. The method of claim 1, wherein the original address (ADD) is a uniform resource locator (URL) or a uniform resource identifier (URI).

5. The method of claim 1, wherein the proxy is integrated with the non-proxy-enabled module as a new module residing on a device.

6. The method of claim 1, wherein the non-proxy-enabled module is a media player.

7. The method of claim 1, wherein the proxy resides on the same device as the application.

8. The method of claim 1, wherein the proxy resides on a different machine or a different virtual machine from the redirection application.

9. The method of claim 1, wherein the proxy, non-proxy-enabled module, and redirection application are integrated into a new module residing on a device.

10. A system for communicating with a destination server using a redirection application residing on a device and non-proxy-enabled module residing on the device, which take addresses or uniform resource locators (URLs) as input to establish connections, the system comprising:
    the device including a hardware processor;
    a hyper-proxy that initiates a connection to the destination server;
    and a redirection application that translates an original address (ADD) into a new address (ADD') using a URL translator, wherein the new address (ADD') contains all information about the original address (ADD) but points to the hyper-proxy;
    wherein the redirection application transmits the new address (ADD') to the non-proxy-enabled module, the non-proxy-enabled module establishing a connection to the hyper proxy using a standard transport protocol;
    wherein the hyper-proxy extracts the original address (ADD) from the new address (ADD') using a processor, and forwards a request to the destination server indicated by the original address (ADD) using a custom protocol that supports persistent connections; and
    wherein data is received at the hyper-proxy from the destination server using the custom protocol, wherein the persistent connections are connections maintained in a persistent state, thereby enabling the connection between the hyper-proxy and the destination server to be kept open when there is not a current session, wherein the custom protocol used to communicate between the hyper-proxy and destination server is different than the standard transport protocol used to communicate between the hyper-proxy and the non-proxy-enabled module, wherein the data is forwarded from the destination server to the non-proxy-enabled module.

11. The system of claim 10, wherein the hyper-proxy forwards the data received from the server to the non-proxy-enabled module and/or redirection application, except for layer 7 protocol messages or commands, wherein the messages or commands may contain addresses (ADD2) pointing towards a resource including a file, a server, or an index/list of files, which the hyper-proxy parses and modifies using a processor, wherein the addresses contained in the modified messages or commands point towards the hyper-proxy but contain all the information of the address (ADD2), before forwarding the modified messages or commands to the non-proxy-enabled module and/or redirection application,
wherein the hyper-proxy forwards the protocol request received from the non-proxy-enabled module and/or redirection application to the server, except for layer 7 protocol messages or commands, which the hyper-proxy parses and modifies using a processor, enabling the addresses contained in the messages or the commands to point toward a corresponding destination server.

12. The system of claim 11, wherein the messages or commands are a playlist.

13. The system of claim 10, wherein the hyper-proxy and the server use a standard transport protocol, and wherein standard transport protocols include TCP and UDP.

14. The system of claim 10, wherein the hyper-proxy and the non-proxy-enabled module and/or redirection application use a standard transport protocol, and wherein standard transport protocols include TCP and UDP.

15. The system of claim 10, wherein the hyper-proxy and the server use a custom protocol.

16. The system of claim 10, wherein the hyper-proxy and the non-proxy-enabled module and/or redirection application use a custom protocol.

17. The system of claim 10, wherein the hyper-proxy establishes a connection with an upstream-proxy, instead of directly establishing a connection to the server, wherein the upstream-proxy then establishes a connection to the server and forwards all data from the server to the hyper-proxy.

18. The system of claim 17, wherein the hyper-proxy and the upstream-proxy use a standard transport protocol, and wherein standard transport protocols include TCP and UDP.

19. The system of claim 17, wherein the hyper-proxy and the upstream-proxy use a custom protocol.

20. The system of claim 17, wherein a custom protocol is used between the hyper-proxy and the upstream-proxy, while a standard protocol is used between the module and the hyper-proxy, and the upstream-proxy and the server.

21. The system of claim 17, wherein the upstream-proxy forwards all data from the server to the hyper-proxy, except for the layer 7 protocol messages or commands, which the upstream-proxy parses and modifies before forwarding to the hyper-proxy, and wherein the hyper-proxy does not parse or modify the layer 7 protocol messages or commands before forwarding to the non-proxy-enabled module and/or redirection application.

22. A system for communicating with a server through a proxy using a redirection application to enable non-proxy-enabled media player modules to use a streaming protocol with a playlist, the system comprising:
a device including a hardware processor;
a hyper-proxy that initiates a connection to the server;
a redirection application that translates an original address (ADD) of a playlist into a new address (ADD') using a URL translator, and wherein the new address (ADD') points to the hyper-proxy and contains all information about the original address (ADD), the new address (ADD') including a port number;
wherein the redirection application transmits the new address (ADD') to the non-proxy-enabled media player module, and wherein the non-proxy-enabled media player module establishes a connection to the hyper-proxy using a standard transport protocol;
wherein the hyper-proxy extracts the original address (ADD) from the new address (ADD') using a processor, and forwards a request to the server indicated by the original address (ADD) using a custom protocol that supports persistent connections;
wherein the hyper-proxy receives the playlist from the server using the custom protocol and modifies addresses in the playlist, which enables the modified addresses to point to the hyper-proxy and contain all the information about the original address, the hyper-proxy providing the modified playlist to the non-proxy-enabled media player module, wherein the persistent connections are connections maintains in a persistent state, thereby enabling a connection between the hyper-proxy and the destination server to be kept open when there is not a current session, and wherein the custom protocol used to communicate between the hyper-proxy and destination server is different than the standard transport protocol used to communicate between the hyper-proxy and the non-proxy-enabled media player module.

23. The system of claim 22, wherein the streaming protocol with a playlist is HTTP Live Streaming (HLS).

* * * * *